OPTICAL SCANNING HEAD WITH FOUR OPTICAL TRANSMISSION LINES AND PHOTOSENSORS
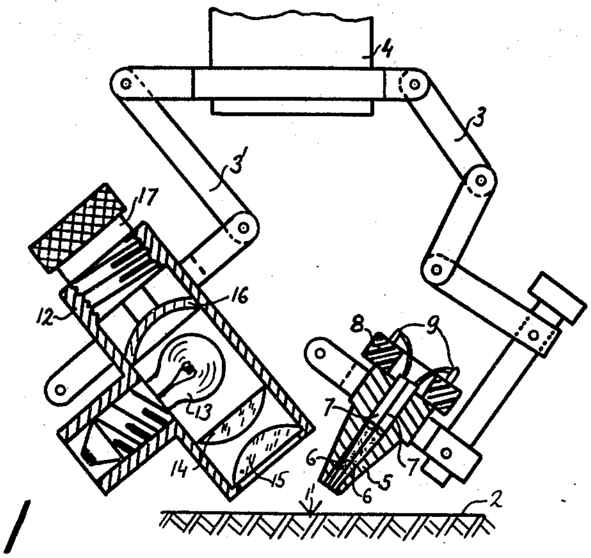
Fig. 1
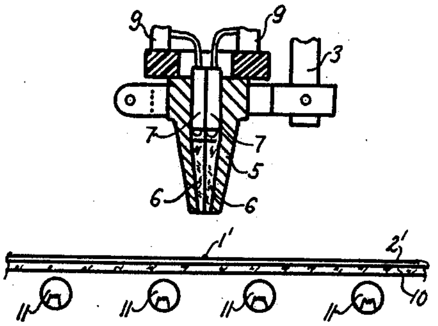
Fig. 2
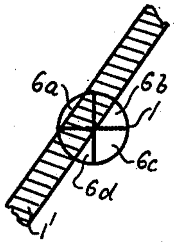
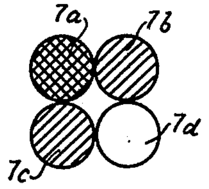
Fig. 1a
Fig. 1b
INVENTORS:
Stanislav JURA
Jaroslav TOIFL
Arthur O. Klein
their Attorney INVENTORS:
Stanislav JURA
BY: Jaroslav TOIFL
Arthur O. Klein
their Attorney INVENTORS:
Stanislav JURA
Jaroslav TOIFL
Arthur O. Klein
their Attorney INVENTORS:
Stanislav JURA
Jaroslav TOIFL
Arthur O. Klein
their Attorney United States Patent Office 3,497,694

Patented Feb. 24, 1970

3,497,694

OPTICAL SCANNING HEAD WITH FOUR OPTICAL TRANSMISSION LINES AND PHOTOSENSORS

Stanislav Jura and Jaroslav Toifl, Prague, Czechoslovakia, assignors to Vyzkumny ustav matematickych stroju, Prague, Czechoslovakia Filed Jan. 9, 1967, Ser. No. 608,202
Claims priority, application Czechoslovakia, Jan. 7, 1966, 105/66
Int. Cl. G05b *1/00;* G02b *5/14;* H01j *39/12*
U.S. Cl. 250—202 14 Claims

ABSTRACT OF THE DISCLOSURE

An optical head without any moving parts has been devised for scanning a generally opaque curve interposed between a source of illumination and the head. The head employs a plurality of light transmission lines symmetrically disposed around a reference axis. The variations of illumination in the general lines resulting from relative deviations of the curve from the reference axis are individually connected into electrical indications, which may be combined into command signals for moving the head along the curve.

BACKGROUND OF INVENTION

In applications such as automatically controlled machining devices and mechanized X–y coordinate plotting systems, a reference curve representative of the workpiece contour or coordinate plot to be duplicated is traced by a scanning head, and the resultant motion of the head is transmitted via an electrical or mechanical link to a machine tool or stylus which follows the transmitted motion and generates an identical contour or plot.

This type of operation may conveniently be done with an optical scanning system. A base region is illuminated by a projecting lamp and an optical scanning head is positioned over the illuminated region for indicating the deviation (from a reference axis of the head) of an opaque curve positioned over the illuminated region and representative of the contour or plot to be duplicated. The head generates command signals as a function of such deviation. These signals are employed to move the head along the curve, thereby developing data to generate a duplicate curve at another location.

The problem with existing optical scanning heads of this type is that the mechanical portion thereof is formed from relatively movable parts which must be precision-fabricated and, even when constructed with extreme care, are difficult to operate and frequently malfunction.

SUMMARY OF THE INVENTION

This problem has been solved with the arrangements of the instant invention, in which an optical scanning head without any movable parts is employed in systems of the above type. In a preferred embodiment, a plurality of fixed optical transmission lines is symmetrically disposed in parallel relation about the axis of the scanning head. The intensity of the illumination received by each transmission line is determined by the magnitude and direction of the displacement of the curve to be scanned from the transmission line. A plurality of photodiodes are individually disposed at the outputs of the transmission lines for generating electrical indications proportional to the intensity of illumination in the associated lines. These electrical indications may then be processed in a suitable manner to move the head along the curve.

Several unitary arrangements are described for simultaneously supporting the scanning head and illuminating the curve to be traced so that the illumination intensity is substantially a maximum along the axis of the head. One illustrative arrangement of this type includes an outer housing the inner surface of which defines a portion of an ellipsoid. The major axis of the latter coincides with the axis of the scanning head, which is longitudinally mounted between the foci of the ellipsoid. A projection lamp is mounted at the focus behind the head, and the curve to be illuminated is positioned adjacent the other focus.

BRIEF DESCRIPTION OF THE DRAWING

The nature of the present invention and its various advantages will appear more fully from the following detailed description of the above and other embodiments thereof when taken in connection with the appended drawing, in which:

FIG. 1 illustrates one form of optical scanning system having an illuminating means and an optical scanning head constructed in accordance with the invention;

FIG. 1*a* is a diagrammatic representation showing a typical orientation of the curve to be scanned with respect to the axis of the head of FIG. 1;

FIG. 1*b* is a diagrammatic representation of the variation of illumination in the individual light conductors of the scanning head of FIG. 1 in the presence of the curve of FIG. 1*a*;

FIG. 2 illustrates a modified form of FIG. 1 in which the illuminating means and the scanning head are disposed on opposite sides of the curve to be scanned;

DETAILED DESCRIPTION

Figures 6, 7:
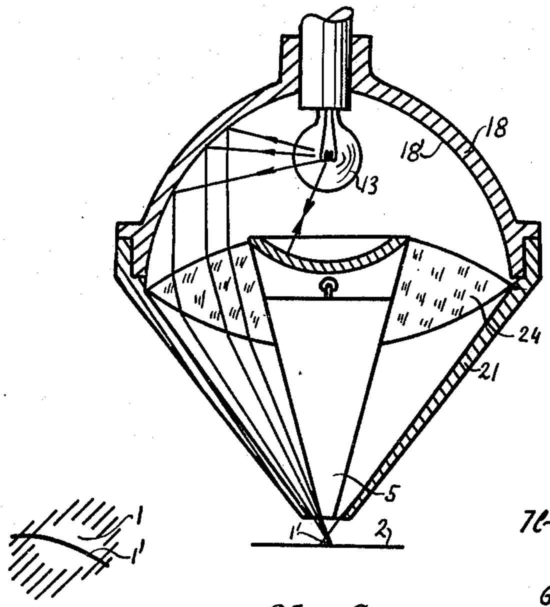
FIG. 6 is a sectional elevation view of an alternative form of the system of FIG. 5.
FIG. 7 is a schematic representation of the illumination of a curve to be scanned by the arrangements of FIGS. 1, 2, 3, 5 and 6.

Referring now in more detail to the drawing, FIG. 1 depicts an illustrative scanning system for illuminating and scanning an opaque curve 1' representative of a contour or plot to be duplicated. The curve 1' overlays a base surface 2, which is illuminated from above at an adjustable acute angle thereto by a narrow light beam 1 (FIG. 7). For reasons to be described below, the illuminated region on the base surface 2 (FIG. 1) should define asmall circle rather than a point, with the diameter of the circle somewhat larger than the width of the curve 1' to be scanned.

The illumination for the curve 1' is provided by an arrangement including a projection lamp 13 and a focusing arrangement therefor, which includes a pair of lenses 14 and 15 and a backing mirror 16 which is adjustable in position with the aid of a screw 17. The lamp 13 and its focusing components are housed within a suitable tube 12. The angle of illumination of the curve 1' may be adjusted by positioning the tube 12, with the aid of a flexible holder 3', which in turn is coupled to a carriage 4. The carriage 4 is adapted to move the entire illustrated scanning system above the surface 2 and, in particular, over the curve 1' in response to output indications from an optical scanning head, having a housing 5. The scanning head is positioned with the aid of a second adjustable holder 3 above the surface 2 in such a manner that a central reference axis of the head is disposed approximately at an equal and opposite acute angle to the curve 1' for receiving the illumination, as by reflection from the surface 2.

Figure 9:
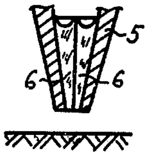
FIG. 9 is a detailed view similar to FIG. 8, of an alternative form of scanning head in accordance with the invention.
Figure 8A:
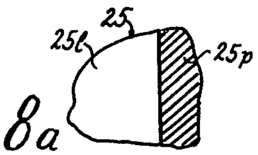
FIG. 8*a* is a plan view of a reference surface suitable for calibrating the scanning head of FIG. 8.
Figure 9A:
FIG. 9*a* is a cross section of one arrangement of light conductors in the scanning read of FIG. 9.
Figure 9B:
FIG. 9*b* is a cross section of another arrangement of light conductors in the scanning head of FIG. 9.

In accordance with the invention, the scanning head is constructed without any movable parts. In particular, a plurality (illustratively four) of elongated and coextensive optical transmission lines *6a–6d* (FIG. 1*a*), which may be of glass, are mounted in generally parallel relation within the housing 5 (FIG. 1). The lines *6a–6d* are symmetrically disposed around the central reference axis of the scanning head. The cross sections of the lines *6a–6d* may define quadrants of a circle centered on the reference axis as shown, but it will be understood that such cross sections may have other suitable shapes, such as individual full circles *6a–6d* (FIG. 9*b*).

Referring again to FIG. 1, the outputs of the optical transmission lines *6a–6d* are individually coupled to the inputs of a corresponding plurality of optical sensing elements *7a–7d*, illustratively photodiodes. The electrical outputs of the photodiodes *7a–7d* are externally accessible through a plurality of terminal lugs 9—9, which are carried on the rear end of the housing 5 by means of a dielectric member 8.

Figure 8:
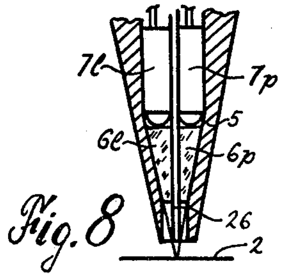
FIG. 8 is a detail view of one form of scanning head in accordance with the invention.

The individual transmission lines *6a–6d* (and the adjacent portion of the housing 5) may be tapered from a minimum cross sectional area at an input location closest to the curve 1' to a maximum cross-sectional area at the interface with the associated photodiodes *7a–7d*. The circle formed by the minimum cross sections of the lines *6a–6d* (FIG. 1*a*) may be equal in area to that of the illumination circle 1 (FIG. 7). The input plane of the transmission lines may be flush with the input end of the housing 5, as in FIG. 9, in which case the inputs of the lines are preferably coated with an optical lacquer. Alternatively, the input plane of the lines may be recessed below the input end of the housing 5, as in FIG. 8. In the latter case, the interrupted illumination from the surface 2 (FIG. 1) is conducted to the inputs of the transmission lines *6l–6p* (FIG. 8) through a plurality of hollow channels defined within the housing 5 by a shutter member 26, with the shape of which is complementary to that of the channels. If desired, the transmission lines 6 may be eliminated completely by extending the shutter member 26 upward to the inputs of the photodiodes *7l–7p*. In the latter case, the hollow channels defined by the shutter member 26 constitute the complete optical paths of the scanning head.

Figure 8B:
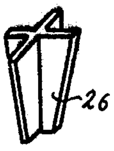
FIG. 8*b* is a perspective view of a shutter member suitable for use in the head of FIG. 8.

The operation of the arrangement of FIG. 1 will now be described in connection with FIGS. 1*a*, 1*b*, 8 and 8*a*. The scanning head is first calibrated, if desired, with the aid of a shutter member similar to that of FIG. 8. In the position shown in FIG. 8*b*, the shutter member prevents light emanating from surface 2 (which is assumed to be illuminated from the left as viewed in FIG. 8) from entering the right hand optical transmission lines *6p*. A reference (FIG. 8*a*) portion 25 of the surface 2, which is disposed below the head, includes a light portion *25l* over which the lines *6l* are positioned), a dark portion *25p* (over which the lines *6p* are positioned), and a straight interface line therebetween intersected by the reference axis of the head. The extremes of illumination thus provided are employed to set the outer limits of the electrical indications from the photodiodes *7l–7p* in any suitable manner.

With the scanning system oriented as shown in FIGS. 1 and 1*a*, different ones of the lines *6a–6d* will be shadowed by different amounts by the opaque curve 1', and the intensity of illumination conveyed to the associated photodiodes 7—7 will correspondingly vary. As shown in the schematic representations of FIG. 1*b*, the effect of the orientation shown in FIG. 1*a* is that diode *7a* receives very little illumination, diode *7c* somewhat more, *7b* even more, and *7d* receives substantially complete illumination. The corresponding variations in the electrical outputs of the diodes *7a–7d* are processed in a suitable manner (not shown) to form command signals for moving the carriage 9 (FIG. 1) and thus the scanner head, along the curve 1'.

FIGS. 2–6 illustrate various other means for illuminating the curve 1' and for supporting the scanning head in the required position. In FIG. 2, for example, the illumination is provided from below the surface 2 through a transparent layer 10, which may be made of frosted glass. The illuminating source comprises a plurality of spaced projection lamps 11 disposed below the layer 10. In this case, the scanning head is positioned substantially normal to the surface 2 and the layer 10. As before, the scanning head is connected to a movable carriage (not shown) by means of the holder 3.

Figures 3, 4, 5:
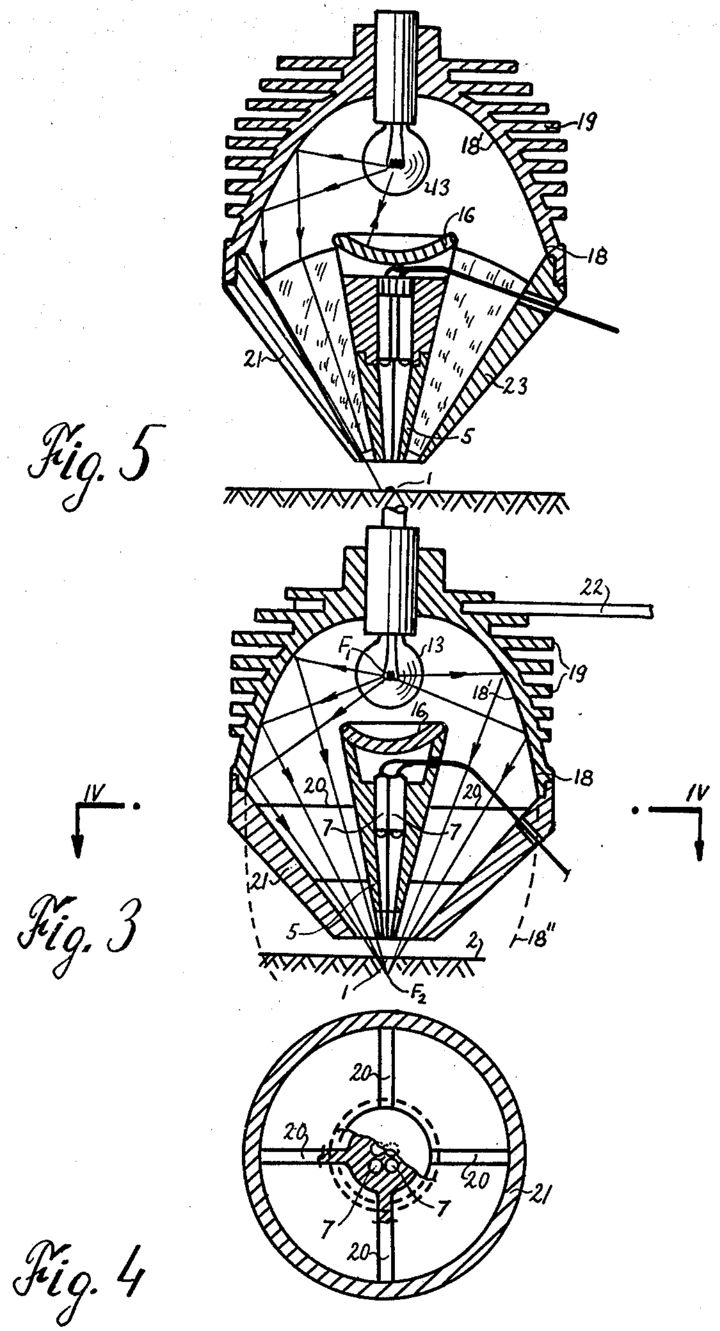
FIG. 3 is a sectional elevation view of an alternative form of the optical scanning system of FIG. 1.
FIG. 4 is a plan view taken along line IV—IV of FIG. 3.
FIG. 5 is a sectional elevation view of a modified form of the system of FIG. 3.

FIG. 3 shows a unitary optical scanning and illuminating apparatus which employs the principles of the present invention and which may be moved along a curve to be scanned by means of a suitable carriage (not shown) through a link 22. The scanning portion of the apparatus consists of an optical head of the type described above. The housing 5 of the head is concentrically supported within a hollow, frustum-conical lower housing 21 by means of a plurality of radial struts 20 (FIG. 4) equally spaced at 90° intervals about the axis of the head.

The illuminating portion of the apparatus of FIG. 3 includes a projection lamp 13 disposed behind the scanning head and enclosed within an upper housing 18 joined at its lower end to the upper end of the lower housing 21. The light rays from the lamp 13 are focused in a region coaxial with and disposed in front of the scanning head by means of an ellipsoidal mirror 18' forming the inner surface of the upper housing 18. The major axis of the mirror 18' coincides with the reference axis of the scanning head. The lamp 13 is mounted at a first focus $F_1$ of the mirror 18', and a curve 1' is placed adjacent but not coincident with the other focus $F_2$ so that the illumination from the lamp 13 is focused into the required circular beam and not a point. A spherical mirror 16, the focus of which coincides with $F_1$ is positioned as shown in back of the housing 5 to (a) further concentrate the source of rays in the lamp 13 at the focus $F_1$ and (b) prevent the direction radiation from the lamp 13 from entering the interior of the scanning head. The heat from the lamp 13 is dissipated by means of fins 19 disposed around the outside of the upper housing 18. The operation of the device of FIG. 3 is the same as that of FIG. 1 or 2.

FIG. 5 illustrates a modified form of FIG. 3 in which the ellipsoidal mirror on the interior of the housing 18 is replaced by a paraboloidal mirror 16 and in which the struts supporting the scanning head in a central position have been replaced by a frustum-conical optically transparent member 23. The member 23 has an inner bore for receiving the scanning head housing 5 in concentrical relationship and an outer surface complementary to that of the lower housing 21. The lamp 13 is disposed at the single focus of the paraboloidal mirror. The top surface of the member 23 is shaped so as to focus the reflected light rays from the mirror 18' into the small circular beam 1 in front of the scanning head. Thus, the combination of the paraboloidal mirror and the member 23 perform the same function as the ellipsoidal mirror of FIG. 3.

FIG. 6 shows a slightly altered form of FIG. 5, in which a convex lense 24, having a central bore for receiving the scanning head housing 5, is substituted for the frustum-conical focusing member 23 of FIG. 5. In all other respects, the embodiments of FIGS. 5 and 6 are identical.

Figure 10:
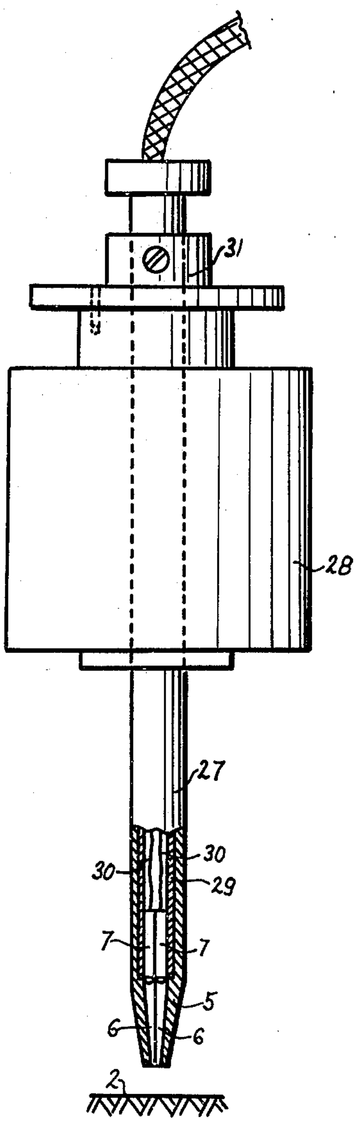
FIG. 10 is an elevation view of a scanning head designed in a form interchangeable with a stylus employed in an X–y plotting system.
Figure 11:
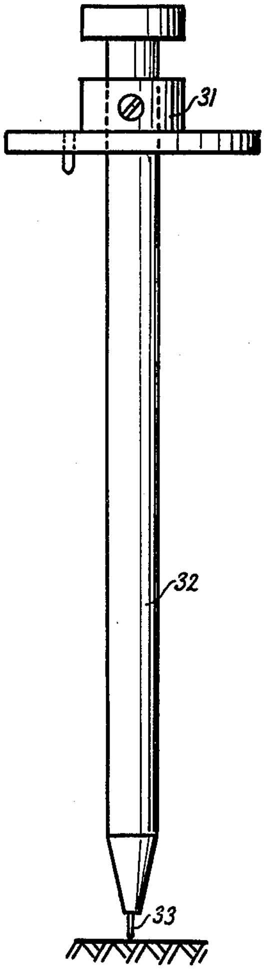
FIG. 11 is an elevation view of the stylus of FIG. 10.

FIG. 11 illustrates a typical stylus employed on an X–Y coordinate plotting table which may be linked to the optical scanning apparatus just described by an arrangement including a drawing head 28 (FIG. 10). The stylus includes a tube 32 (FIG. 11) having a flange 31 on one end thereof, with which it may be mounted to the drawing head 28, and a depending stylus tip 33 on the other end. In order to facilitate servicing, and to provide maximum compatibility with an interchangeability between the optical scanning unit and the associate plotting unit, the scanning head of this invention may be formed in a manner compatible with the stylus of FIG. 11. To accomplish this, the scanning head housing may be adapted to form a removable termination 29 of a tube 27, which is identical to the stylus tube 32 of FIG. 11. The top end of the tube 27 (FIG. 10) is provided with a flange 31 identical to that of FIG. 11. A plurality of electrical conductors 30 (FIG. 10) which pass upwardly through the tube 27 to a suitable amplifier (not shown) are connected to the outputs of the photodiodes 7 in the termination 29.

With the arrangements of FIGS. 10 and 11, either the stylus or the scanning head may be removably secured within the drawing head 28.

It will be understood that the above-described embodiments are only illustrative of the principles of the invention. Since many other variations and modifications thereof will now occur to those skilled in the art, it is intended that the scope of the appended claims not be limited to the specific disclosure herein contained.

What is claimed is:

1. In an optical scanning head for automatically following a generally opaque curve situated on a surface and being optically interposed between an illuminating source and the head and for ultimately deriving command signals from the relative orientation of the curve with respect to a reference axis of the head:

a carriage supporting said head and moving it in response to said signals relatively to said surface; at least four fixed optical transmission lines symmetrically disposed around the axis; and a corresponding number of optical sensing elements individually aligned with and disposed at the output ends of the transmission lines for generating signals proportional to the intensity of illumination received from the source by the associated transmission line in the presence of the interposed curve.

2. A scanning head as defined in claim 1, in which the optical transmission lines comprise hollow channels defined by a shutter member of complementary shape.

3. A scanning head as defined in claim 1, in which said optical transmission lines are formed substantially entirely from transparent material.

4. A scanning head as defined in claim 1, in which said optical transmission lines have cross-sections which define segments of a circle centered on the reference axis.

5. A scanning head as defined in claim 1, in which the optical transmission lines have cross sections which individually define separate circles around the reference axis.

6. A scanning head as defined in claim 1, in which the cross section of each transmission line increases continually in area from a minimum nearest the curve to a maximum adjacent the associated sensing element.

7. A scanning head as defined in claim 1, in which the sensing elements comprise photoelectric devices.

8. In an optical scanning system for indicating the relative deviation from a reference axis of a generally opaque curve situated on a surface and being positioned in front of an illuminated region:

a scanning head comprising, in combination, at least four optical transmission lines symmetrically disposed around the reference axis for receiving the illumination, and optical sensing means individually associated with the output of each of the transmission lines for generating output indications proportional to the relative intensity of illumination in the respective transmission line;

a carriage supporting said head and moving it in response to said signals relatively to said surface; and means mounted in the substantially fixed relation to the head for illuminating the region.

9. A system as defined in claim 8, in which the illuminated surface is a planar surface, and the illuminating means is arranged to direct a focused beam of light against the surface at an acute angle, the reference axis defining substantially an equal and opposite angle with respect to the surface.

10. A system as defined in claim 8, in which the illuminated surface is a planar surface, and the illuminating means and the scanning head are positioned on opposite sides of the surface.

11. A system as defined in claim 8, in which the illuminating means comprises, in combination, an ellipsoidal mirror the major axis of which is coincident with the reference axis; light projecting means disposed at one focus of the mirror, the illuminated surface being disposed at the other focus; means for supporting the scanning head intermediate the light projection means and the illuminated region; and means for isolating the rays of the light projecting means from the adjacent portion of the scanning head.

12. A system as defined in claim 8, in which the illuminating means comprises, in combination, a paraboloidal mirror the axis of which is coincident with the reference axis; light projecting means disposed at the focus of the mirror, the illuminated surface being disposed perpendicular to the axis at a location beyond the light projecting means; said carriage for supporting the scanning head being disposed intermediate the light projecting means and the illuminated surface; and means for isolating the rays from the light projecting means from the adjacent portion of the scanning head.

13. A system as defined in claim 12, in which said carriage comprises an optically transparent body having a central opening for receiving the scanning head, the surface of the body being contoured to focus light rays reflected from the mirror to the illuminated region.

14. A system as defined in claim 8, in which the system further comprises a drawing head removably carrying a stylus and the outside surface of the scanning head is shaped to conform to the outer surface of the stylus, so that the stylus and the scanning head may be interchanged within the drawing head.

References Cited

UNITED STATES PATENTS

| | | | |
|---|---|---|---|
| 3,182,291 | 5/1965 | Nassimbene | 250—227 X |
| 3,207,904 | 9/1965 | Heinz | 250—208 X |
| 2,419,641 | 4/1947 | Hart | 250—202 X |
| 2,445,041 | 7/1948 | Scholz | 250—202 X |
| 2,851,643 | 9/1958 | Limberger | 250—202 X |
| 2,872,590 | 2/1959 | Leavens | 250—288 X |
| 3,135,857 | 6/1964 | Von Voros | 250—202 X |
| 3,190,159 | 6/1965 | Wilke et al. | 250—202 X |

JAMES W. LAWRENCE, Primary Examiner

C. R. CAMPBELL, Assistant Examiner

U.S. Cl. X.R.

250—208, 227